March 15, 1927.  R. D. EVANS  1,621,006
POWER FACTOR METER
Filed Dec. 7, 1921
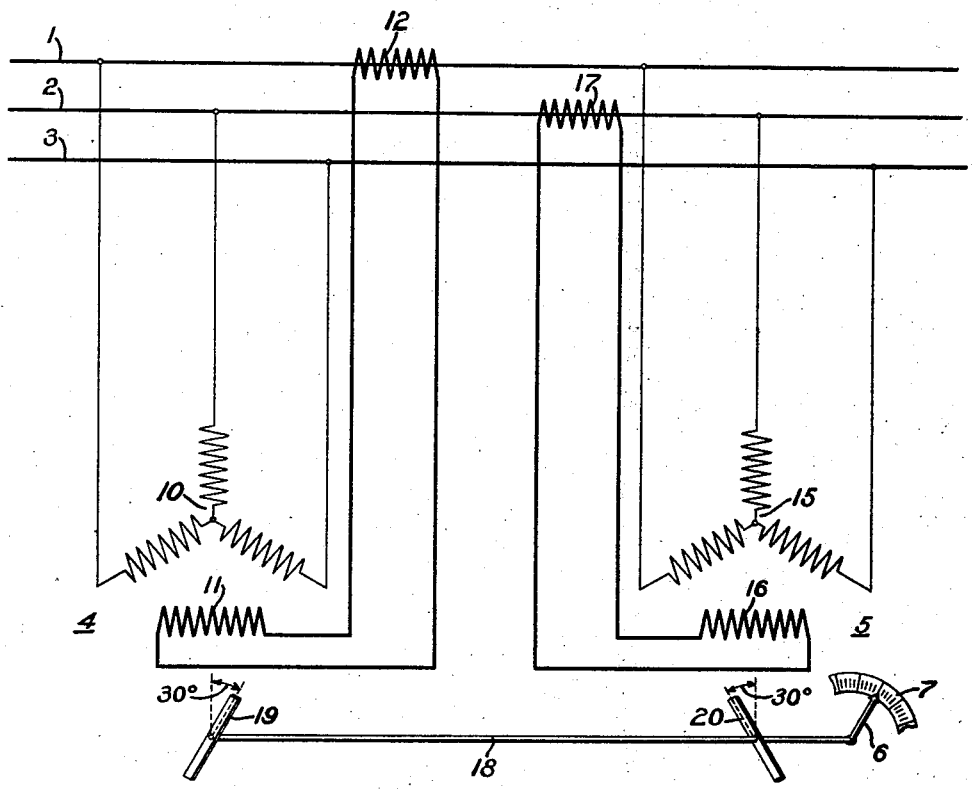
WITNESSES:
INVENTOR
Robert D. Evans.
BY
ATTORNEY Patented Mar. 15, 1927.

1,621,006

UNITED STATES PATENT OFFICE.

ROBERT D. EVANS, OF PITTSBURGH, PENNSYLVANIA, ASSIGNOR TO WESTINGHOUSE ELECTRIC & MANUFACTURING COMPANY, A CORPORATION OF PENNSYLVANIA.

POWER-FACTOR METER.

Application filed December 7, 1921. Serial No. 520,614.

My invention relates to measuring instruments and it has particular relation to phase meters for polyphase circuits.

The object of my invention is to provide a device for accurately and reliably measuring the power-factor of a circuit upon which by reason of unequal load distribution, for example, unbalanced voltage conditions obtain.

More specifically stated, it is the object of my invention to provide a plurality of movable meter elements of the vane type that are mounted upon a common shaft and are adapted to be influenced in accordance with different combinations of circuit conditions.

My invention may best be understood by reference to the accompanying drawing, the single figure of which is a diagrammatic view of a measuring instrument organized and connected in accordance with the present invention.

Referring to the drawing, a supply or load circuit comprising conductors 1, 2 and 3 has associated therewith two power-factor meters of the iron-vane type comprising windings 4 and 5 which co-operate to effect movement of a common pointer or arm 6 around a dial or scale 7.

The meter windings 4 comprise a three-phase coil 10, the respective windings of which are connected in star relation to the supply-circuit conductors 1, 2 and 3. A single current coil 11 is adapted to co-operate with the voltage coils 10 in the usual manner and is energized from the secondary winding of a series transformer 12, which is inserted in the supply-circuit conductor 1.

The other meter windings 5 comprise a similar star-connected voltage coil 15 and a co-operating current coil 16 which is energized from the secondary winding of a series transformer 17. The transformer 17 is inserted in the supply-circuit conductor 2.

The pointer or arm 6 is mounted upon a shaft or spindle 18 to which are rigidly secured two magnetic vanes 19 and 20 that respectively correspond to the meter windings 4 and 5, each vane being adapted to be subjected to the torque exerted by the combined action of the corresponding voltage and current coils.

The vanes 19 and 20 for the illustrated three-phase circuit are disposed upon the spindle 18 at an angular relation of substantially sixty degrees, as indicated.

The positions of the parts shown in the drawing correspond to the unity-power-factor position of the respective vanes 19 and 20. In the event of a lower power factor obtaining in the supply circuit, the combined action of the meter windings 4 and 5 upon the displaced vanes 19 and 20 will cause a shifting of the pointer 6 in the one or the other direction.

The connection of the current elements or windings 11 and 16 in different phases of the load circuit and the mechanical displacement of the vanes 19 and 20 cause the effects of unbalance to be cancelled or neutralized, whereby the device serves to indicate power-factor of the circuit irrespective of the load or voltage unbalance of the polyphase circuit.

In other words, if under balanced unity-power-factor conditions the pointer will assume the illustrated position, which corresponds to zero or neutralized torque upon the spindle 18, under unbalanced supply-circuit conditions, its position for the different current relations will remain unchanged, if the load circuits are still non-inductive.

Consequently, by suitable calibration of the apparatus, the scale or dial 7 may be graduated to indicate the degree of departure from the normal or unity-power-factor position, and thus indicate the power-factor of the circuit.

I consider that the theory of operation of the instrument may be explained by reference to the symmetrical components of the current and voltage of the polyphase circuit, although I do not wish to be limited by such an explanation because of the complexity of the electrical quantities and forces involved.

If the currents and voltages of the circuit are unbalanced, negative phase-sequence components of these quantities are present. However, the power-factor meter should be unaffected by the product of the positive phase-sequence component of voltage and the negative phase-sequence component of current, as this quantity is not concerned with the load but only results in an exchange of power between phases. The same is true of the product of the negative phase-sequence component of voltage and the positive phase-sequence component of current.

The torque upon the moving element of a power-factor meter of the type illustrated varies with its position as a cosine function if the position at unity power-factor is such that maximum torque is exerted. The torque is also a cosine function of the electrical phase displacement between the current and voltage applied to the instrument. It is possible therefore to combine the electrical and mechanical phase displacements in such a way as to obtain zero torque for the quantities mentioned.

In the case of a three-phase circuit, which I have illustrated by way of example, the current coils are energized from separate phases of the circuit and the magnetic vanes are angularly displaced 60°, as described above. Since the currents traversing the current coils proportional to the negative phase-sequence components are 240° out of phase and the vanes are displaced 60°, the torques upon the two elements of the power-factor meter resulting from the positive phase-sequence component of voltage and the negative phase-sequence component of current are 180° out of phase, or the net torque is zero. The torques resulting from the negative phase-sequence component of voltage and the positive phase-sequence component of current are likewise 180° out of phase. However, the torques produced by the positive phase-sequence components of voltage and current and by the negative phase-sequence components of voltage and current, respectively, are not 180° out of phase. Therefore, the pointer 6 of the instrument is deflected in accordance with changes in the electrical displacement of the applied voltage and current, irrespective of the degree of unbalance, as indicated by the relative values of the positive and negative phase-sequence components.

It will thus be seen that I have provided a measuring instrument whereby the unbalanced conditions in a supply circuit react through the agency of a plurality of sets of differently energized voltage and current windings upon a pair of displaced vanes to thereby effect an indication of the departure of the load-circuit power-factor from the normal unity-power-factor position of balance.

I do not wish to be restricted to the specific circuit connections or arrangement of parts herein set forth as various modifications thereof may be made without departing from the spirit and scope of my invention. I desire, therefore, that only such limitations shall be imposed as are indicated in the appended claims.

I claim as my invention:

1. A measuring instrument for a polyphase circuit comprising a plurality of sets of co-operating coils connected to each phase of the circuit and a plurality of mechanically connected magnetizable elements respectively influenced by said sets of coils and displaced by a predetermined angle.

2. A measuring instrument for a three-phase circuit comprising two sets of star-connected co-operating coils and two mechanically connected magnetizable elements respectively influenced by said sets of coils and displaced by an angle of sixty degrees.

3. A measuring instrument for a three-phase circuit comprising two sets of co-operating current and potential coils energized differently from the three-phase circuit and two mechanically connected magnetizable elements respectively influenced by said sets of coils and displaced by an angle of sixty degrees.

4. A measuring instrument for a polyphase circuit comprising a plurality of sets of voltage coils connected to the respective phases and a plurality of co-operating current coils energized from different phases, a plurality of vanes influenced by the respective sets of voltage and current coils, and means for mechanically connecting said vanes.

5. A measuring instrument for a polyphase circuit comprising a plurality of sets of voltage coils connected to the respective phases and a plurality of co-operating current coils energized from different phases, a plurality of magnetizable vanes influenced by the respective sets of voltage and current coils, and displaced by a predetermined angle, and means for mechanically connecting said vanes.

6. A measuring instrument for a three-phase circuit comprising two sets of star-connected voltage coils and two co-operating current coils energized from different phases, a plurality of magnetizable vanes influenced by the respective sets of voltage and current coils, and means for mechanically connecting said vanes.

7. A measuring instrument for a three-phase circuit comprising two sets of star-connected voltage coils and two co-operating current coils energized from different phases, magnetizable vanes influenced by the respective sets of voltage and current coils, and displaced by an angle of sixty degrees, and means for mechanically connecting said vanes.

In testimony whereof, I have hereunto subscribed my name this 23rd day of November 1921.

ROBERT D. EVANS.